United States Patent [19]

Canova et al.

[11] Patent Number: 4,933,395

[45] Date of Patent: Jun. 12, 1990

[54] PROCESS FOR IMIDIZING VINYL-AROMATIC COPOLYMERS

[75] Inventors: Luciano Canova, Novara; Umberto Giannini, Milan; Enrico Albizzati, Arona; Antonio Proto, Novara, all of Italy

[73] Assignee: Montedipe S.p.A., Milan, Italy

[21] Appl. No.: 307,635

[22] Filed: Feb. 8, 1989

[30] Foreign Application Priority Data

Feb. 11, 1988 [IT] Italy ............................... 19370 A/88

[51] Int. Cl.$^5$ ............................................... C08F 8/30
[52] U.S. Cl. .................................. 525/374; 525/327.6; 525/359.3; 525/371; 525/357; 525/337; 525/343

[58] Field of Search ............ 525/379, 378, 371, 359.3, 525/359.4, 357, 374, 327.4, 327.6

[56] References Cited

U.S. PATENT DOCUMENTS 3,778,418 12/1973 Nakayama ........................... 525/374
4,404,322 9/1983 Saito et al. ............................. 525/74

Primary Examiner—C. Warren Ivy
Assistant Examiner—T. McDonald, Jr.
Attorney, Agent, or Firm—Stevens, Davis, Miller & Mosher

[57] ABSTRACT

Process for the imidization of vinyl-aromatic copolymers containing maleic anhydride, using as an imidizing agent an amide, the imidization being conducted in an anhydrous state and in the presence of a catalyst.

20 Claims, No Drawings

PROCESS FOR IMIDIZING VINYL-AROMATIC COPOLYMERS

BACKGROUND OF THE INVENTION

This invention relates to a process for imidizing vinyl-aromatic copolymers, in particular styrene copolymers, containing maleic anhydride.

The vinyl-anhydride copolymers containing maleic anhydride are known from U.S. Pat. No. 3,954,722. Said copolymers may be processed under heat, but, when they are mixed together at a high temperature with other polymeric products (with a view of obtaining, for example, an impact-or shock-resistant material), there are observed decomposition reactions as well as the formation of superficial blisters and cross-linkings. The process becomes thus extremely difficult and the superficial aspect of the products thus obtained is unacceptable.

When the maleic anhydride is replaced by the corresponding imide, as described in British Patent No. 1, 185, 544, the above-mentioned drawbacks disappear. Nonetheless, the use of maleic imide as a co-monomer involves some drawbacks inasmuch as the maleic imide is not easily to be found and its synthesis is laborious and rather complex.

It is also known from U.S. Pat. Nos. 3,651,171; 3,840,499; and 4,381,373 and from German Patent No. 3,430,802 to carry out the imidization of the preformed styrene-maleic anhydride copolymer with primary amines, if desired in the presence of water. Moreover, U.S. Pat. No. 4,404,322 teaches that the imidization with amines may be carried out either in the molten state or in organic solvents.

DISCLOSURE OF THE INVENTION

It has now been discovered by the present inventors that a simple and economically more convenient method for effecting the imidization of vinyl-aromatic copolymers containing maleic anhydride consists in conducting the imidization in the anhydrous state, that is, in the absence of water, in the presence of special catalysts and using an amide as an imidizaiton agent.

The imidization reaction may be carried out while maintaining the reacting mixture in the molten state or in the presence of organic solvents for the copolymer such as for example aromatic hydrocarbons or ketones such as (respectively) xylenes or cyclohexanones.

As imidization agents currently used are amides of the formula:

R-CO-NH-R'  (I)

wherein; R and R', either equal to or different from each other, represent hydrogen or alkyl, cycloalkyl, aryl or heterocyclic groups containing from 1 to 18 carbon atoms, if desired substituted in the ring with alkyl radicals containing from 1 to 4 carbon atoms or with a halogen such as chlorine, bromine or fluorine.

Examples of amides that may be used in the process according to the present invention are: formamide, acetamide, N-methylformamide, N-methylacetamide, propionamide, butyramide, amide of cyclohexane-carboxylic acid, benzamide, nicotinamide as well as mixtures thereof.

The quantity of imidization agent to be used may vary from 5% to 30% by weight with regard to the mixture formed by a copolymer and an amide, but preferably is between 20% and 25% by weight.

The catalysts used in the process according to this invention are chosen from amongst Lewis acids, medium and strong Broensted acids, the salts of the medium and strong Broensted acids themselves and the respective mixtures.

By "medium or strong" Broensted acids are meant those acids in which in pH is either equal to or lower than 5, but preferably lower than 3. Amongst the Lewis acids may be cited, just for exemplifying purposes: zinc chloride, boron fluoride, aluminum chloride and aluminum bromide, the tetrachlorides of tin and titanium, the pentachloride and the pentafluoride of antimony, and so on. Moreover, there may be cited triphenyl-boron and triphenoxy-boron.

As medium and strong Broensted acids and their salts may be cited for purely exemplifying purposes: fluorosulphonic acid, trifluoromethylsulphonic acid ($CF_3SO_3H$), benzenesulphonic acid, and the alkyl-benzene sulphonic acids (with alkyl groups containing from 1 to 12 carbon atoms), as well as the corresponding alkali matal and ammonium salts; in particular there may be cited amongst the salts: ammonium chloride and ammonium fluoroborate.

The quantity of catalyst may vary from 0.0001 to 100 mols, but preferably from 0.01 to 10 mols per 100 mols of anhydrous groups present in the copolymer.

The vinyl-aromatic copolymers to be subjected to the imidization process have a content in anhydrous anhydride between 5% and 50%, but preferably between 10% and 40% by mols.

By the term "aromatic vinyl," as used in the present description and in the claims, it is intended to denote a monomer of the following general formula:

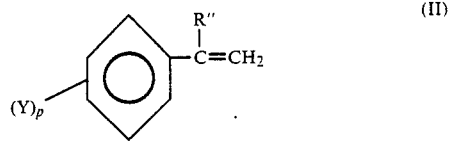

(II)

wherein: R" represents hydrogen or an alky radical having from 1 to 4 carbon atoms; p is equal to zero or to an integer from 1 to 5; and Y represents a halogen or an alkyl radical having from 1 to 4 carbon atoms.

Examples of vinyl-aromatic monomers having the above general formula (II) are: styrene, methyl-styrene, mono-di, tri-, tetra-, and penta-chlorostyrene and the corresponding alpha-methyl-styrenes, such as for instance: para-methyl-alpha-methyl-styrene, etc.

These monomers may be used either alone or in admixture with each other or with other co-polymerizable comonomers, such as for example acrylonitrile, vinylacetate, vinylchloride, vinylidenechloride, olefins, diolefins, halogenated diolefins, and vinyl ethers. Said copolymers may also contain elastomeric phases of different nature which, when present in amounts not exceeding 15% by weight, and preferably between 2% and 12% by weight, allow the copolymers containing same to withstand impact. The expression "elastomeric phases" means a blended or grafted rubber-like component which is capable of improving the resiliency of the entire mass.

The imidization reaction may be conducted by reacting the copolymer with the imidization agent at a high temperature. The preferred reaction temperatures are between 100° and 350° C., although the most preferred range is between 120°-280° C.

The reaction may furthermore be coducted either at a pressure lower than atmospheric pressure or at a higher pressure.

According to a particular embodiment of the invention, the reaction between the basic copolymer and the amide may be carried out in extruders, mixers or other similar equipment, provided with suitable degassing devices.

The imidized copolymers of the present invention, show an excellent heat stability (TLS) as well as a content of imidic units exceeding 5%. On the basis of infrared spectrophotometric analysis, it may be inferred that these imidic units are of a cyclic type, though such a proposed structure must not be considered as binding with respect to the scope of the present invention.

The imidized copolymers may be processed according to the usual thermoplastic polymer transformation techniques, such as for instance extrusion, injection molding, thermoforming, etc., and may be used for obtaining manufactured articles of any shape and/or size.

The imidized copolymers of this invention may be used in the preparation of sheets, plates, structural shapes (sections), films, pipes, filaments, etc.

The new imidized copolymers may be admixed with suitable additives (fillers), such as for instance products that will improve the impact-resistance (resiliency), pigments, reinforcing fibers (glass, carbon, etc.), mineral fillers, self-extinguishing agents, stabilizers, lubricating agents, plasticizers, etc.

Last but not least, they may be additioned with blowing agents (e.g., chloro-fluoro-hydrocarbons, azodicarbonamide, etc.) and be used in the foamed form, if desired, admixed with said fibers (glass, carbon, etc.) and/or with other inorganic reinforcing fillers, thereby providing low-density composite materials with excellent physical properties, in particular with a high glass transition temperature (Tg). The transition point (Tg) is determined by means of a differential calorimeter and is the temperature corresponding to the flex point which appears in the thermogram when the thermal capacity undergoes a sudden change. The rate of the increase of temperature equals 20° C./minute and the measurement is carried out after a first heating up to 200° C. followed by a cooling down.

The quality of the imidized copolymers may be even better evaluated by means of a thermogravimetric analysis (TGA), by gradually increasing the temperature (at a thermal rate of 20° C./minute and under nitrogen) and by continuously recording the (decreasing) weight of the specimen.

For the evaluation of the imidized copolymers, there are used the following parameters:
  (a) the TGA-loss, namely the weight percentage lost by the sample because of heating in a nitrogen atmosphere at between 50° and 300° C.
  (b) the maximum stability temperature (TLS), expressed as ° C., which is the temperature corresponding to a 5% TGA-loss.

The following examples are given just for illustrative purposes and are not in any way to be considered as limiting the scope of the invention itself.

EXAMPLE 1 (Comparative)

Into a glass reactor provided with a stirrer and a vent for exhausting the volatile components, were loaded simultaneously 40 grams of a copolymer containing 76.1% by weight of styrene and 23.9% by weight of maleic anhydride, having a glass transition temperature equal to 145.6° C., a TGA equal to 0.85%, and an inherent viscosity (in THF at 30° C.; solution concentration=0.25% by weight) equal to 0.53 dl/g, and 12 g of acetamide under nitrogen.

The reaction mass was gradually heated up to the melting point, and then up to 220° C., while removing the volatile products of the reaction. The reaction was then continued, gradually increasing the temperature from 220° to 230° C. (over a time of about 2 hours) and was then cooled down under nitrogen.

The raw product was then diluted with 100 cm$^3$ of tetrahydrofuran, thereby obtaining a solution from which the polymer was recovered by precipitation with methanol, and then filtering and drying under vacuum at 115° C.

The copolymer showed an inherent viscosity (in THF, at 30° C.) equal to 0.56 dl/g, a maximum stability temperature (TLS) of 360° C., and a glass transition temperature (Tg) of 156.2° C. Said copolymer, subjected to thermogravimetric analysis (TGA), at a temperature increase rate of 20° C/ minutes, under nitrogen, showed a weight loss of 0.55% (within the range of 50°-300° C.). Data and results are recorded below on Table 1.

EXAMPLE 2

Example 1 was repeated but for the addition of 1.5 g of ammonium fluoroborate ($NH_4BF_4$). Data and results are recorded on Table 1.

EXAMPLE 3

Example 1 was again repeated with the addition of 1.5 g of aluminum chloride. Data and results are recorded on Table 1.

EXAMPLE 4

Example 1 was repeated again but with the addition of 1.5 g of para-toluene-sulphonic acid. Data and results are recorded on Table 1.

Example 5

Example 2 was repeated, replacing acetamide by 14.3 g of propionamide. Data and results are recorded on Table 1.

EXAMPLE 6

Example 2 was repeated again, but the acetamide was replaced by 11 g of N-methyl-acetamide. Data and results are recorded on Table 1.

TABLE 1

| CHARACTERISTICS OF THE IMIDIZED COPOLYMERS | | | | |
|---|---|---|---|---|
| Example (Imidization Agent) | Tg (°C.) | TGA % b.w. | TLS (°C.) | VISCOSITY (dl/g) |
| BASIC COPOLYMER | 145.6 | 0.85 | 352 | 0.53 |
| Ex. 1 (acetaide) (*) | 156.2 | 0.55 | 360 | 0.56 |
| Ex. 2 (acetamide + $NH_4BF_4$) | 160.1 | 0.56 | 385 | 0.53 |
| Ex. 3 (acetamide + $AlCl_3$) | 169.3 | 0.81 | 380 | insoluble |
| Ex. 4 (acetamide + $CH_3$—$C_6H_4$—$SO_3H$) | 162.2 | 0.41 | 380 | 0.50 |
| Ex. 5 (propionamide) | 169.5 | 0.51 | 385 | 0.57 |
| Ex. 6 (N-methyl-acetamide + $NH_4BF_4$) | (n.a.) | 0.50 | 385 | 0.52 |

(*) = comparative example
(n.a.) = not available

What is claimed is:

1. A process of imidizing vinyl-aromatic copolymers containing maleic anhydride, using an amide as the imidizing agent, characterized in that the imidization is conducted in an anhydrous state and in the presence of a catalyst selected from the group consisting of Lewis acids; medium and strong Broansted acids, having a pk below 5; the salts of said medium or strong Broensted acids and their mixtures.

2. A process according to claim 1, characterized in that the imidization is conducted while maintaining the reacting mixture in a molten state.

3. A process according to claim 1, characterized in that the imidization is conducted in the presence of an organic solvent.

4. A process according to claim 3, characterzed in that said solvent is an aromatic hydrocarbon.

5. A process according to claim 4, wherein the aromatic hydrocarbon is xylene or a mixture of xylenes.

6. A process according to claim 3, characterized in that the solvent is a ketone.

7. A process according to claim 6, wherein the ketone is cyclohexanone.

8. A process according to any one of claims 1 to 7, characterized in that the copolymer to be imidized contains from 5% to 50% in mols of maleic anhydride.

9. A process according to any one of claims 1 to 7, characterized in that the copolymer to be imidized contains from 10% to 40% in mols of maleic anhydride.

10. A process according to any one of claims 1 to 7, characterized in that the imidizing agent is an amide of the formula:R-CO-NHR', wherein R and R', either equal to or different from each other, represent hydrogen or alkyl, cycloalkyl, aryl, or heterocyclic groups having from 1 and 8 carbon atoms, and, when desired, substituted in the nucleus with alkyl radicals containing from 1 to 4 carbon atoms, or with a halogen.

11. A process according to claim 7, characterized in that the quantity of amide is between 5% and 30% by weight with respect to the mixture formed by the copolymer and the imidizing agent.

12. A process according to claim 7, characterized in that the quatity of amide is between 20% and 25% by weight with respect to the mixture formed by the copolymer and the imidizing agent.

13. A process according to claim 10, characterized in that the imidizing agent is selected from the group consisting of formamide, N-mathyl-formamide, propionamide, butyramide, amide of cyclohexane-carboxylic acid, benzamide, and nicotinamide.

14. A process according to any one of claims 1 to 7, characterized in that the Lewis acid is selected from the group consisting of $ZnCl_2$, $BF_3$, $AlCl_3$, $AlBr_3$, $SnCl_4$, $TiCl_4$, $BbCl_5$ and $SbF_5$, triphenyl-boron, triphenoxy-boron and their mixtures.

15. A process according to any one of claims 1 to 7, characterized in that the medium or strong Broensted acid or the corresponding salts are selected from the group consisting of hydrochloric, fluoroboric, fluorosulphonic, trifluoromethyl-sulphonic, benzenesulphonic and alkylbenzensulphonic acid, with alkyl groups having from 1 to 12 carbon atoms, and the ammonium or alkali metal salts of the acids and their mixtures.

16. A process according to any one of claims 1 to 7, characterized in that the quantity of catalyst to be used is between 0.001 and 100 mols per 100 mols of anhydrous groups present in the copolymer.

17. A process according to any one of claims 1 to 7, characterized in that the quantity of catalyst to be used is between 0.01 and 10 mols per 100 mols of anhydrous groups present in the copolymer.

18. A process according to any one of claims 1 to 7, characterized in that the imidization temperature is between 100° and 350° C.

19. A process according to any one of claims 1 to 7, characterized in that the imidization temperature is between 120° and 250° C.

20. A process according to any one of claims 1 to 7, characterized in that the catalyst is selected from the group consisting of $ZnCl_4$, $AlCl_3$, para-toluene-sulphonic acid, $NH_4BF_4$, $NH_4Cl$, and their mixtures.

* * * * *